CHARACTER POSITION DETECTION AND CORRECTION SYSTEM

Filed Jan. 15, 1962 3 Sheets-Sheet 1

INVENTOR.
JOHN B. CHATTEN

BY Robert D. Sanborn

ATTORNEY

Jan. 25, 1966 J. B. CHATTEN 3,231,860

CHARACTER POSITION DETECTION AND CORRECTION SYSTEM

Filed Jan. 15, 1962 3 Sheets-Sheet 2

INVENTOR.
JOHN B. CHATTEN
BY
Robert D. Sanborn
ATTORNEY

CHARACTER POSITION DETECTION AND CORRECTION SYSTEM
Filed Jan. 15, 1962 3 Sheets-Sheet 3
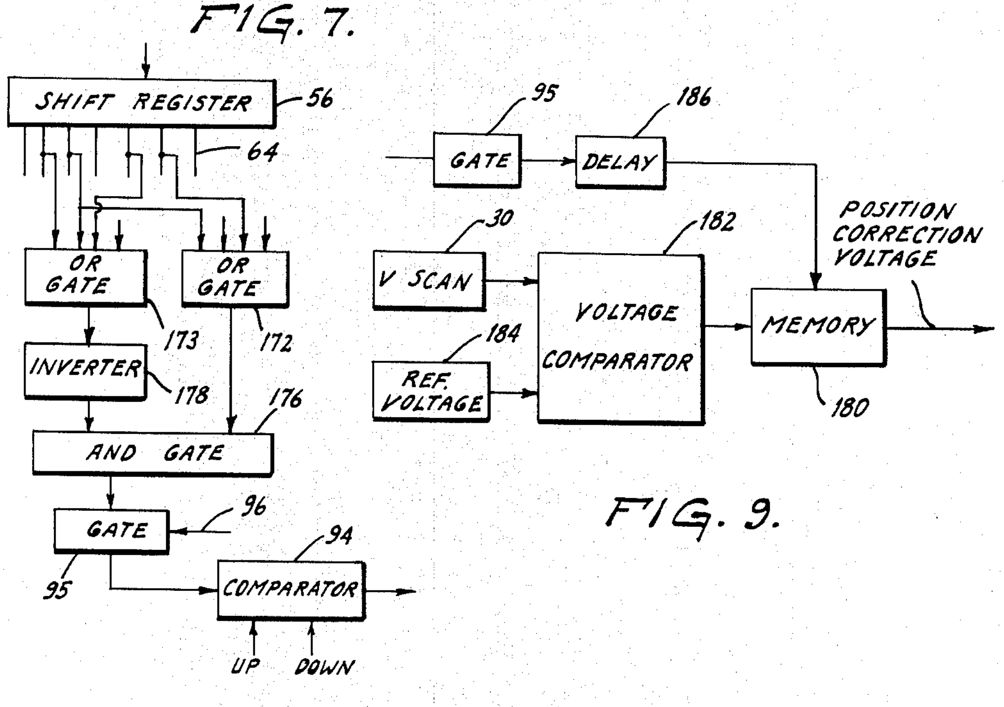
FIG. 7, FIG. 9.
| | STAGES | | | | | | | | | | | |
|---|---|---|---|---|---|---|---|---|---|---|---|---|
| GATE 172 | 18 | 40 | 62 | 84 | 106 | 128 | 150 | 172 | 194 | 216 | 238 | 260 |
| GATE 173 | 19 | 41 | 63 | 85 | 107 | 129 | 151 | 173 | 195 | 217 | 239 | 261 |
FIG. 8.
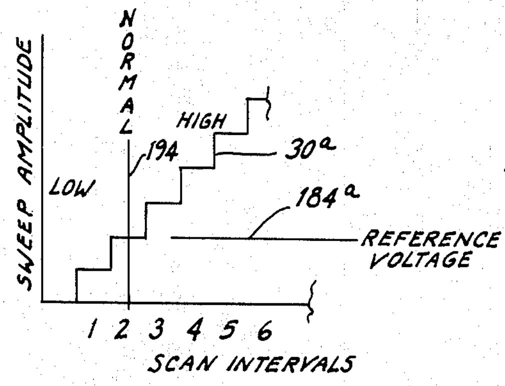
FIG. 10.
INVENTOR.
JOHN B. CHATTEN
BY
Robert D. Sanborn
ATTORNEY United States Patent Office 3,231,860

Patented Jan. 25, 1966

3,231,860
CHARACTER POSITION DETECTION AND CORRECTION SYSTEM

John B. Chatten, Philadelphia, Pa., assignor to Philco Corporation, Philadelphia, Pa., a corporation of Delaware Filed Jan. 15, 1962, Ser. No. 166,081
10 Claims. (Cl. 340—146.3)

The present invention relates to character recognition systems and more particularly to means for detecting any deviation between a line of print to be read and the scanning path of the character recognition system.

In one form of character recognition system now in current use, each character to be recognized is scanned by a suitable scanning means to generate time spaced signals which are characteristic of the character which is scanned. Means such as a shift register are employed to supply these time spaced signals to resistor-correlation masks in a plurality of different ways so that the character scanned, if it is one which will be recognized by the system, will be recognized despite any horizontal or vertical displacement which does not place any part of the character outside of the raster. In character recognition system adapted to read a horizontal line of characters, such as a line of address on an envelope or a line of print on a printed page, the document is first scanned with a relatively large raster to determine the location of one end, for example the left end, of the line of print. The scanning means is then positioned so that the first character is scanned by a raster which is only slightly larger than a single character. Upon recognition of the first character, the raster is displaced in a horizontal direction by an amount equal to the width of one character. The new area is then scanned to determine if a recognizable character is contained therein. This process is repeated, character by character, for the entire line. If for some reason the line of print to be read is misaligned on the document and/or the document is misaligned in the reader, the repeated horizontal displacements of the raster without any vertical correction will cause the position of the raster to shift with respect to the line of print. If the misalignment of the line of print is great enough, one or more of the characters of the line may be incompletely scanned by the raster. In the past this difficulty has been ignored with a consequent degradation of system performance or overcome by employing a separate character location step prior to each recognition step. This latter means, while effective, is both time-consuming and expensive to implement.

Therefore it is an object of the present invention to provide simple and inexpensive means for indicating the position of a scanned character with respect to a scanning raster.

Another object is to provide means for generating a position correction signal in response to the scanning of characters displaced from a preferred position.

Still another object of the invention is to provide means for automatically tracking a line of print which is to be read character by character.

In general the invention comprises means for comparing the time at which the data representing a preselected character occupies a predetermined position in the data shifting circuit with the time of occurrence of an event which is representative of the position of the scanning raster. The polarity or sense of the resulting scan correction signal is determined by which of the two events is the first to occur. For a better understanding of the present invention together with other and further objects thereof reference should now be had to the following detailed description which is to be read in conjunction with the accompanying drawings in which FIG. 1 is a block diagram of a character recognition system which embodies the present invention;

FIG. 7 is a block diagram of an alternative means for generating a signal representative of a predetermined position of the character data in the data shifting circuit;

FIG. 8 is a table which describes the relationship between certain circuit components of FIG. 7;

FIG. 9 is a block diagram of an alternative form of position error signal generating circuit; and FIG. 10 is a block diagram illustrative of the operation of the circuit of FIG. 9.

Figure 1:
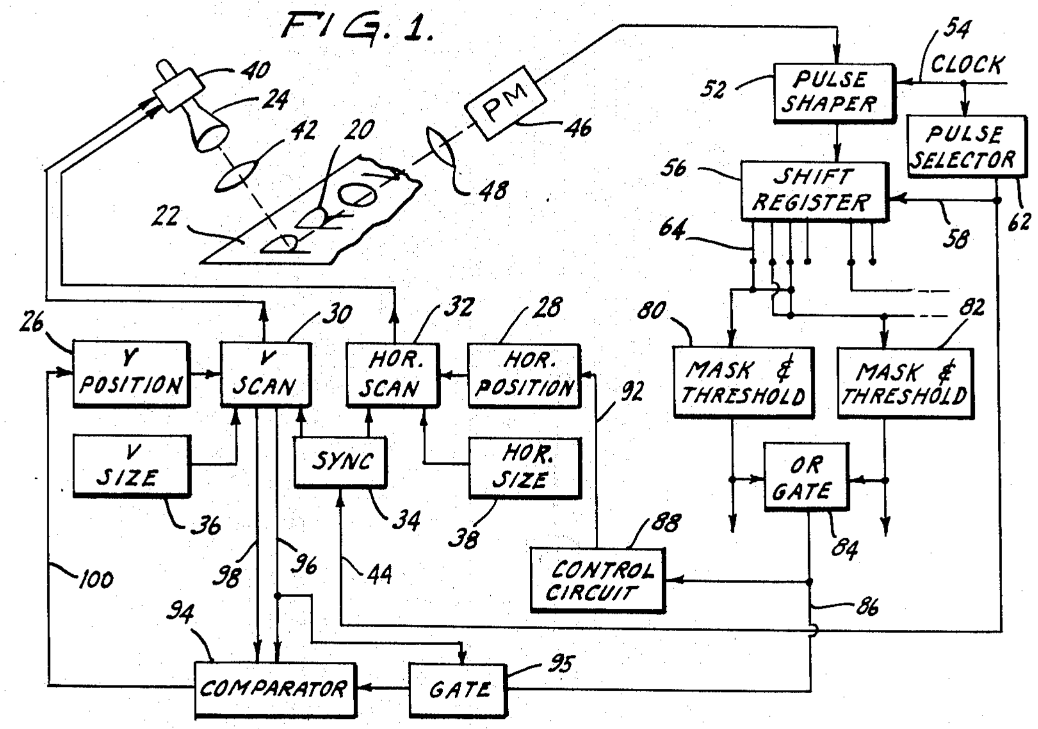

In the system shown in FIG. 1 the characters to be recognized are nonreflective characters 20 appearing on a white or reflective sheet 22. Cathode ray tube 24 forms the output of a flying spot scanner system which also includes the vertical position control 26, horizontal position control 28, vertical scan generator 30, horizontal scan generator 32, scan synchronizing means 34, vertical size control 36, and horizontal size control 38. The output of vertical scan generator 30 and horizontal scan generator 32 are supplied to the deflection yoke 40 of cathode ray tube 24. A lens 42 is provided for focusing the spot generated by cathode ray tube 24 on sheet 22. As will be explained in more detail presently, the flying spot scanning system just described scans an area on sheet 22 with a rectangular raster, the size of the raster on sheet 22 being slightly larger than one of the characters 20. The area scanned by the raster may be selected by adjusting vertical position control 26 and horizontal position control 28 to cause the raster to coincide with any selected character on sheet 22. The scanning of the raster is controlled by pulses supplied at input 44 to synchronizing circuit 34.

The area of the sheet 22 illuminated by the raster supplied by tube 24 is imaged on the photosensitive surface of photomultiplier tube 46 by means of lens 48. The entire sheet 22 may be imaged on the photosensitive surface of photomultiplier tube 46, however it is only the area scanned by the raster that is sufficiently illuminated to provide an appreciable response from photomultiplier tube 46.

The output of photomultiplier tube 46 is supplied to a pulse shaper 52 which receives a second input from a clock pulse source represented by arrow 54. The clock pulses supplied at input 54 may be regularly spaced rectangular pulses having a duty cycle of the order of 0.25. Pulse shaper 52 may be any circuit which will convert the time varying signal supplied by photomultiplier tube 46 into pulse signals having one amplitude if the area scanned during one clock pulse interval is entirely white and a different value if the area scanned includes a portion of a character 20. One of these two values may be zero.

The output of pulse shaper circuit 52 is supplied to the input of shift register 56. Shift register 56 may be a conventional serial type shift register in which the data in the register is shifted one place for each pulse received at input 58. Preferably each stage of shift register 56 is provided with two complementary output connections. The "white" output of a stage is at some selected potential, for example minus 6 volts, and the "black" output of that stage is at another selected potential, for example ground potential, if no character information is currently stored in that stage. When character information is present in the stage, the "white" output is at ground potential and the "black" output is at minus 6 volts. It will be recognized that the same result can be achieved by a single output connection from the shift register stage if an inverter is employed to generate the second signal.

Clock pulses from input 54 are supplied to input 58 of shift register 56 by way of pulse selector circuit 62. The signals from pulse selector circuit 62 are also supplied to the input 44 of synchronizing circuit 34. Pulse selector circuit 62 may be a counter circuit which cyclically passes the first $n$ pulses of a group of $m$ pulses and then blocks the remaining $m$ minus $n$ pulses. For example, pulse selector circuit 62 may pass the first 22 pulses of each group of 24 pulses supplied by input 54 and then block the remaining two pulses of the group. As will be explained in more detail presently, the time interval represented by the two blocked clock pulses is allowed as flyback time for the flying spot scanner.

The outputs 64 of shift register 56 are connected to character recognition mask circuits 80 and 82. These mask circuits may be of the type disclosed and claimed in the copending application of James S. Bryan and Charles F. Teacher, entitled "Identification System," Serial No. 166,082, filed January 15, 1962, now Patent 3,167,745, granted January 26, 1965.

Figure 2:
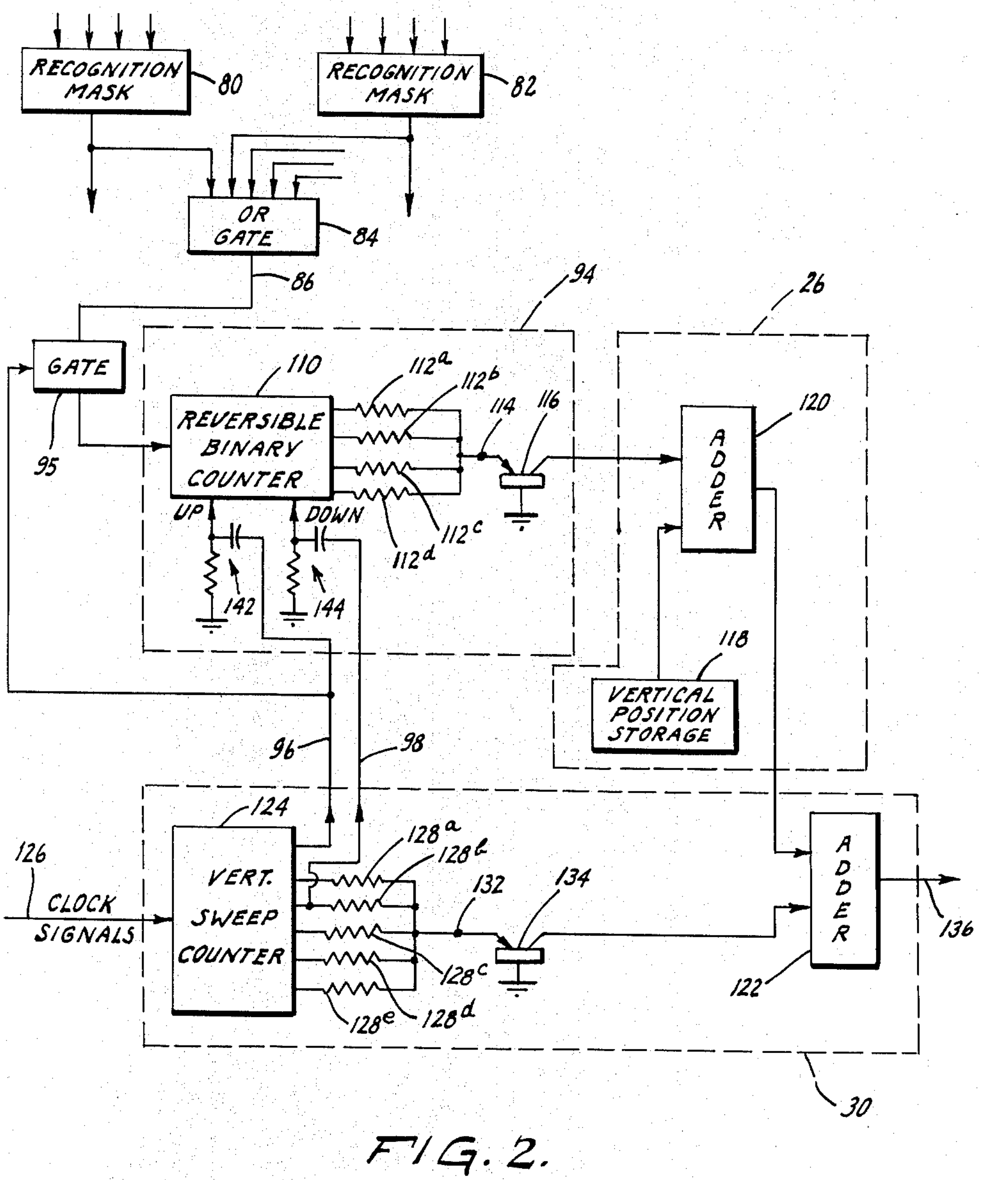
FIG. 2 is a detailed diagram, partially in block form, of the scan position correction circuits of FIG. 1.

While only two mask circuits 80 and 82 are shown in FIG. 2, it is to be understood that one such circuit is provided for each character to be recognized. Therefore a typical system may include on the order of 100 mask circuits of the type represented by block 80.

The output of all of the mask circuits of which blocks 80 and 82 are representative are connected to a single or gate 84.

Or gate 84 has one input connected to the output connection of each of the mask circuits 80, 82, etc. Or gate 84 is provided with a single output connection 86 which is energized if any one of the inputs to or gate 84 is energized. Output 86 is connected to an input of control circuit 88. Control circuit 88 schematically represents the program circuits of the scanner which cause the raster generated by tube 24 to advance from one character to the next when a recognition signal is generated by any one of the mask circuits 80, 82, etc. In its simplest form circuit 88 may be a coupling circuit which supplies a pulse to input 92 of horizontal position control 28 each time a signal appears at the output of or gate 84. In other embodiments of the invention it may include additional circuits for advancing the scan to the next character if no recognition is obtained of the preceding character.

Horizontal position control 28 may be a stepping circuit which produces a selected incremental increase in amplitude of its output signal in response to each signal supplied at input 92. A circuit of this type is described in detail in my copending application entitled Character Recognition System Employing Character Size Determination Apparatus for Controlling Size of Scanning Raster, Serial No. 166,065, filed January 15, 1962, now Patent 3,223,973, issued December 14, 1965.

The output 86 of or gate 84 is also connected to one input of comparator circuit 94 through inhibit gate 95. Comparator circuit 94 is shown in more detail in FIGURE 2. Signals are also supplied to comparator circuit 94 from vertical scan circuit 30 by way of connections 96 and 98. Output 96 is also connected to the control input of gate 95. Comparator circuit 94 supplies a vertical correction signal to vertical position circuit 26 by way of connection 100. Again vertical position circuit 26 may be a stepping circuit similar to horizontal position circuit 28.

In FIGURE 2 blocs 80, 82, 84 and 85 correspond to similarly numbered elements in FIGURE 1. The circuit enclosed by broken lines 26, 30 and 94 correspond to similarly numbered blocks in FIGURE 1. As shown in FIGURE 2, comparator circuit 94 comprises a reversible binary counter 110 which is set to count in an upward direction by a pulse signal supplied by way of input 96 and to count in a downward direction by a pulse signal supplied by way of input 98. These signals to be counted are supplied by input 86. Gate 95 normally passes signals from or gate 84 to counter 110. However it blocks any signals which occur in time coincidence with a signal on lead 96.

The four outputs of binary counter 110 are connected to respective first terminals of resistors 112$^a$–112$^d$. The other end terminals of resistors 112$^a$–112$^d$ are connected to common junction point 114 which is also the emitter of grounded base transistor 116. Resistors 112$^a$–112$^d$ have resistances in the ratio 1:2:4:8 respectively. Therefore the amplitude of the current at point 114 and hence the amplitude of the output signal at the collector of transistor 116 is proportional to the count registered in counter 110.

Vertical position storage circuit 118 is a circuit which provides a fixed bias signal of proper magnitude to center the raster on the first character of the line to be scanned. Circuit 118 may comprise a simple, manually adjusted potentiometer or it may comprise, for example, a plurality of storage flip-flop circuits followed by a digital analog converter network similar to resistors 112$^a$–112$^d$. The flip-flops in circuit 118 may be set automatically as the result of a line-finding sequence which precedes the actual reading sequence.

The collector of transistor 116 and the output connection of vertical position storage circuit 118 are connected to the two inputs of a linear adder circuit 120. The output of linear adder circuit 120 is connected to one input of a second linear adder circuit 122 in vertical scan generator 30.

Vertical scan generator 30 comprises a vertical sweep counter 124 which is advanced by clock signals supplied at input 126 from sync circuits 34 or directly from pulse selector 62 of FIGURE 1. A digital-to-analog conversion network comprising resistors 128$^a$–128$^e$ is provided for converting the digital information supplied by counter 124 to a corresponding analog signal at common terminal 132 of resistors 128$^a$–128$^e$. Common terminal 132 is coupled to a second input of adder circuit 122 by way of transistor 134 which is connected in the same manner as transistor 116. The signal at the output 136 of adder 122 comprises the composite vertical deflection signal which is supplied to yoke 40 of cathode ray tube 24.

As explained in detail in my above-mentioned copending application, counter 124 counts to some selected value, for example, 22, and resets to zero. Output connection 96 is connected to a point in said counter circuit which is energized at the time of reset. Output lead 98 is connected to a point which is energized at some intermediate count, for example the count of 8. Coupling circuits 142 and 144 schematically represent means for insuring that the up and down control inputs of counter 110 are not both energized at once. That is, the signal provided by output 98 will be differentiated by coupling network 144 and the signal provided by output 96 will be differentiated by coupling network 142. It is to be understood that if a sawtooth sweep generator circuit is substituted for the step voltage generator represented by a counter circuit 124 and resistors 128$^a$–128$^e$, the necessary control voltages for binary counter 110 may be supplied by a suitable binary counter or the like energized directly from clock pulses present at input 54 or the selected clock pulses present at the output of pulse selector 62.

Figure 3:
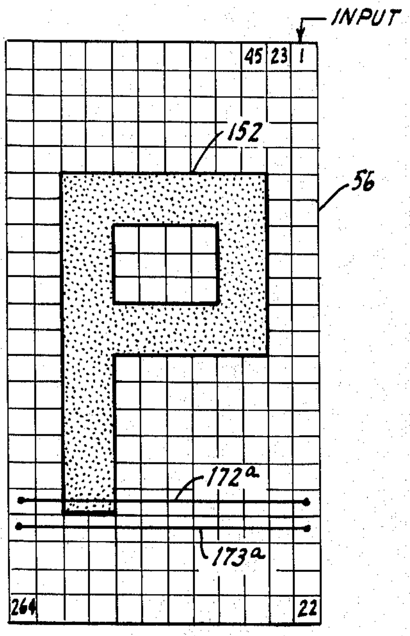
FIGS. 3–6 are diagrams which are illustrative of the operation of the circuit of FIGURES 1 and 2.

The operation of the circuits of FIGURES 1 and 2 will now be explained with reference to FIGURES 3–6. It will be assumed that the raster generated by cathode ray tube 24 in cooperation with vertical scan generator 30 and horizontal scan generator 32 comprises 12 vertical scans of 22 intervals each for a total of 264 scan intervals. It is to be understood that additional intervals may be allowed between each vertical scan or retrace but since no shift pulses are supplied to shift register 56 during these intervals, no change in the setting of shift register 56 will occur during the retrace intervals. As explained in the copending application of Bryan et al., shift register 56 preferably includes 264 stages corresponding to the 264 scan intervals. The 264 squares within rectangle 56 of FIG. 3 represent the 264 stages of shift register 56 arranged in 12 columns of 22 stages each. The pulse signals from pulse shaper 52 are supplied to the first stage, i.e. the upper, right hand stage of FIG. 3, of shift register 56 and reset this stage. The data registered by the first stage is then transferred stage by stage to successive stages in response to the shift pulses applied at input 58. The shaded area 152 in FIG. 3 represents the stages which will be reset after 264 scan intervals if the character scanned is a letter P properly centered in the raster. FIG. 3 is included solely as an aid in visualizing the progress of data through register 56. The operation of the invention depends only on the electrical connections between the successive stages of register 56 and between the stages of register 56 and masks 80, 82, etc. No particular physical arrangement of stages is required.

Recognition masks 80, 82, etc. are so designed that a recognition signal is generated by the appropriate one of the recognition circuits when the pattern of set stages is centered in the shift register 56 as shown in FIG. 3. As indicated above, this pattern is centered in the register at the end of twelve complete scans or 264 scan intervals if the character is properly centered in the raster. Thus the recognition signal for a properly centered character will occur at the end of the twelfth vertical scan.

The reversible binary counter circuit 110 of FIG. 2 is preferably set at some intermediate count. For example, if counter 110 has a capacity of 16, it may be set at a count of 8. If the recognition signal occurs at the end of a vertical sweep, gate 95 will block the signal supplied by or gate 84 and no change will result in the setting of counter 110. Since counter 110 does not change, the next character will be scanned with the same vertical displacement of the raster as the character just recognized.

A signal is supplied by the conenction 98 approximately midway through the vertical sweep. This sets counter 110 to count in the downward direction. As the data is shifted through the register 56 stage by stage the pattern 152 of set stages will move down line by line. If the character scanned lies below the center of the raster it will become centered in the register before the end of a vertical sweep. Thus the signal supplied by or gate 84 in response to the recognition signal will reach counter 110 while it is still set to count downwardly in response to a signal supplied by connection 98. Therefore the count register in counter 110 will be decreased by 1 and the next character will be scanned with the raster displaced downwardly by 1 step.

If the character scanned is above the center of the raster, the recognition signal will not be generated until after the vertical retrace interval. At this time, counter 110 is set to count upwardly in response to the retrace signal supplied by way of connection 96. The increase in the count registered in counter 110 as the result of the late recognition signal will result in an upward displacement of the raster.

Similar corrections will be made in response to successive recognition signals unless the counter 110 reaches either limit of its range. Counter 110 is preferably reset to its original intermediate count on each line finding cycle. On each line finding cycle vertical position storage circuit 118 is set so that the sum of the signal supplied by this unit and the output signal of counter 110, when set to the selected intermediate count, centers the raster on the next character to be scanned.

Figure 4:
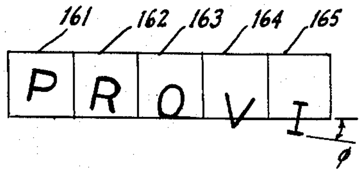
Figure 5:
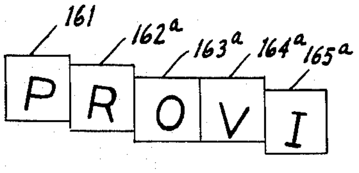
Figure 6:
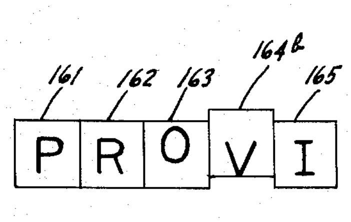

FIGS. 4–6 illustrate the corrections made in the vertical displacement of the scan by circuit 94. The letters "PROVI" in FIG. 4 represent a line of print which is skewed at an angle $\phi$ with respect to its proper position. Boxes 161–165 represent successive positions of a scanning raster if no vertical correction is introduced. It will be seen that the letters V and I lie partly outside the respective rasters and hence will not be recognized.

FIGURE 5 shows the effect of a correction circuit 94. Since the letter P is below the center of the raster represented by block 161, the next raster 162^a will be at a lower level than raster 161. Since the R in raster 162^a is still below the center of the raster, the next raster 163^a will again be displaced downwardly from raster 162^a. If the letter O is approximately centered in raster 163^a no correction signal will be generated and raster 164^a will occur at the same level as raster 163^a. It will be seen that the correction circuit 94 maintains the characters of the skewed line approximately centered in each raster. The recognition masks 80, 82, etc. are designed to recognize the individual characters even though they are skewed by the angle $\phi$ from the normal upright position.

FIGURE 6 illustrates the effect of the upward displacement of the single letter O in an otherwise normal line of characters. A correction signal will be generated in response to the late recognition of the letter O. This will displace raster 164^b in an upward direction. The normally placed letter V will occur below the center of the upwardly displaced raster 164^b and hence will produce an early recognition signal. Hence the raster 165 will be displaced from raster 164^b i.e., it will occur in its normal position. Suitable time constant circuits or memory circuits may be included which will inhibit the action of the correction circuit unless two successive characters are misplaced. However, as shown in FIG. 6, the invention will operate satisfactorily without such circuits.

In the embodiment shown in FIGURE 7 the input signal to comparator 94 is obtained from two or gates 172 and 173 which are connected to the output connections 64 of selected stages of shift register 56. FIGURE 8 is a table showing the selected stages coupled to each of the or gates 172 and 173. Shaded bars 172^a and 173^a in FIGURE 3 illustrate the stages which are connected to or gates 172 and 173, respectively.

The output of or gate 172 is connected directly to one input of and gate 176. The output of or gate 173 is coupled to a second input of and gate 176 by way of inverter 178. The output of and gate 176 is coupled to the input of comparator 94 by way of gate 95. Gate 95 of FIGURE 7 corresponds to the similarly numbered element in FIGURES 1 and 2.

And gate 176 will provide an output signal when one of the stages connected to or gate 172 is registering character information and none of the stages connected to or gate 173 is registering character information. This will occur when the pattern of set stages representing the scanned character has moved to the point where it is centered in the register. The operation of comparator 94 will be as explained above in connection with the description of FIGURES 1 and 2.

FIGURES 9 and 10 illustrate an alternative circuit for generating a position correction voltage. The signal from vertical scan circuit 30 is supplied to one input of a voltage comparator circuit 182. A source 184 of fixed reference voltage is connected to a second output of voltage comparator circuit 182. The output of comparator circuit 182 is connected to a gated memory circuit 180. Memory circuit 180 may be a box-car circuit or similar circuit capable of storing a signal supplied thereto. The position recognition signal supplied by gate 95 is supplied through delay circuit 186 to the control input of memory circuit 180. Delay circuit 186 preferably has a delay equal to a few, for example three to five, scan intervals.

In FIGURE 10 the stepped waveform 30^a represents the stepped vertical scan signal supplied by circuit 30. The vertical line 194 represents the time at which gated memory circuit 180 will be reset for a normally placed character. This occurs later than retrace owing to the delay introduced by delay circuit 186. Line 184^a represents the amplitude of the signals supplied by reference voltage source 184. Since source 184 and scan circuit 30 both provide the same potential at the time memory 180 is reset for normally placed characters, no correction signal will appear at the output of circuit 180 for normally placed characters.

As shown in FIGURE 10, if the position signal supplied by gate 95 occurs early, a negative correction signal will be supplied by comparator 182 to memory circuit 180. If the signal from gate 95 occurs later than normal, a positive correction signal will be supplied to memory circuit 180. The circuit shown in FIGURE 9 takes the place of comparator circuit 94 in FIGURES 1, 2 and 7. Therefore the output of memory circuit 180 may be connected to one input of adder 120 of FIGURE 2, In the foregoing description it has been assumed that stepped scans are employed. However it is within the scope of the invention to employ continuously variable, i.e., sawtooth deflection signals. Similarly, shift register 56 may be replaced by a tapped delay line provided the necessary synchronism is maintained in the various scanning circuits.

While the invention has been described with reference to the particular embodiments thereof, it will be apparent that various modifications and other embodiments thereof will occur to those skilled in the art within the scope of the invention. Accordingly I desire that the scope of my invention be limited only by the appended claims.

I claim:

1. In a system for individually scanning successive characters of a line of print, means for maintaining registration between the scanning raster and the individual characters of the line of print comprising, scanning means including a movable scanning element for scanning a character of said line along a preselected raster to generate signals representative of the character, a multioutput signal delay means, means coupling the output of said scanning means to the input of said signal delay means, means coupled to said scanning means for generating a second signal representative of a preselected position of said scanning element, means coupled to said signal delay means for generating a third signal in response to the preselected energization of selected ones of the outputs of said signal delay means, and means coupled to said second signal generating means and said third signal generating means and responsive to said second signal and said third signal for generating a raster position correction signal, the sense of said correction signal being determined by the relative order of occurrence of said second signal and said third signal.

2. A system in accordance with claim 1 wherein said signal delay means comprises a multistage shift register,

3. A system in accordance with claim 1 wherein said scanning means comprises means for scanning a character along a plurality of spaced paths and wherein said second signal is generated at a time at which said scanning element is at a selected point in one of said spaced paths.

4. A system in accordance with claim 3 wherein said second signal is generated at a time substantially coincident with the time at which said scanning element is at an end of one of said spaced paths.

5. In a system for individually scanning successive characters of a line of print, means for maintaining registration between the scanning raster and the individual characters of the line of print comprising, scanning means including a movable scanning element for scanning a character along a preselected raster to generate signals representative of the character, a multioutput signal delay means, a plurality of character recognition mask circuits coupled to said outputs of said delay means, means coupled to said scanning means for generating a second signal at the times at which said scanning element is at preselected points in said raster, means coupled to said character recognition mask circuits, said last mentioned means providing a third signal in response to the generation of a recognition signal by any one of said character recognition mask circuits, and means coupled to said last mentioned means and said second signal generating means and responsive to said second signal and said third signal for generating a raster position correction signal, the sense of said correction signal being determined by the relative order of occurrence of said second signal and said third signal.

6. A system in accordance with claim 5 wherein said signal delay means comprises a multistage shift register.

7. In a system for individually scanning successive characters of a line of print, means for maintaining registration between the scanning raster and the individual characters of the line of print comprising, scanning means including a movable scanning element for scanning a character of said line to generate signals representative of said character, said scanning means further including first deflection control means for periodically moving said scanning element in a first direction at a first rate and second deflection control means for periodically moving said scanning element in a second direction different from said first direction and at a rate different from said first rate, thereby to produce a scanning raster larger than said character, a multioutput signal delay means, means coupling the output of said scanning means to the input of said signal delay means, means coupled to said scanning means for generating a second signal at times related to the times at which said scanning element occupies a preselected position in said first direction, means coupled to said signal delay means for generating a third signal in response to the preselected energization of selected ones of the outputs of said signal delay means, means coupled to said second signal generating means and said third generating means and responsive to said second signal and said third signal for generating a raster position correction signal, the sense of said correction signal being determined by the relative order of occurrence of said second signal and said third signal, and means coupled to said last mentioned means and said scanning means for altering the position of said raster in said first direction in a sense determined by the sense of said correction signal.

8. A system in accordance with claim 7 wherein said third signal generating means comprises first signal combining means coupled to selected taps on said signal delay means, said selected taps providing signals at selected times which are representative of a first line of incremental areas within said raster, second signal combining means coupled to other selected taps on said signal delay means, said other selected taps providing signals at said selected times which are representative of a second line of incremental areas within said raster displaced in said first direction from said first line, and means coupled to said first and second signal combining means for generating an output signal in response to the presence of character representative signals on at least one of said taps coupled to said first combining means and the absence of character representative signals on all of said taps coupled to said second combining means.

9. A system in accordance with claim 8 wherein said first and second lines are straight and parallel to each other.

10. In a system for individually scanning successive characters of a line of print, means for maintaining registration between the scanning raster and the individual characters of the line of print comprising, scanning means including a movable scanning element for scanning a character along a raster comprising *m* parallel scans, each scan including *n* incremental areas, where *m* and *n* are integers, said scanning means generating a signal representative of a selected characteristic of the area scanned at each of the *m* times *n* incremental areas, a multioutput signal delay means, means coupling the output of said scanning means to the input of said signal delay means, means coupled to said scanning means for generating a second signal at times related to the times at which said scanning element occupies a preselected position, third signal generating means including first signal combining means coupled to selected taps on signal delay means, said selected taps being energized simultaneously by signals generated at corresponding first positions of said scanning element on successive scans, second signal combining means coupled to other selected taps on said signal delay means, said other selected taps being energized simultaneously by signals generated at corresponding second positions of said scanning element on successive scans, said first positions being different from said second positions, and means coupled to said first and second signal combining means for generating an output signal only in response to the presence of character representative signals on at least one of said taps coupled to said first signal combining means and the absence of a character representative signal on all of said taps coupled to said second signal combining means, means coupled to said second signal generating means and said third signal generating means and responsive to said second signal and said output signal of said third signal generating means for generating a raster position correction signal, the sense of said correction signal being determined by the relative order of occurrence of said second signal and said output signal of said third signal generating means, and means coupled to said last mentioned means and said scanning means for altering the position of said raster in a first direction in a sense determined by the sense of said correction signal.

References Cited by the Examiner

UNITED STATES PATENTS

| | | | |
|---|---|---|---|
| 2,906,819 | 9/1959 | Smith | 340—146.3 |
| 2,919,426 | 12/1959 | Rohland | 340—146.3 |
| 2,963,683 | 12/1960 | Demer et al. | 340—149 |
| 3,112,468 | 11/1963 | Kamentsky | 340—146.3 |

MALCOLM A. MORRISON, *Primary Examiner.*